United States Patent [19]
Hollis

[11] Patent Number: 6,149,057
[45] Date of Patent: Nov. 21, 2000

[54] SYSTEM AND METHOD FOR TRANSFER OF FUNDS USING PREPRINTED SEALED SECURITY CODE PACKET AND AUTOMATED TELLER MACHINE

[76] Inventor: Dean Hollis, Puebla #237 Colonia Roma, Mexico City, Mexico, 06700

[21] Appl. No.: 09/223,581

[22] Filed: Dec. 30, 1998

[51] Int. Cl.[7] .................................................. G06F 17/60
[52] U.S. Cl. ......................... 235/379; 235/381; 235/487; 902/8
[58] Field of Search ................................... 235/379, 381, 235/383, 487, 494; 902/8

[56] References Cited

U.S. PATENT DOCUMENTS

| | | | |
|---|---|---|---|
| 4,172,552 | 10/1979 | Case et al. ................................ | 235/380 |
| 4,341,951 | 7/1982 | Benton .................................... | 235/379 |
| 4,608,485 | 8/1986 | Miura ...................................... | 235/379 |
| 5,350,906 | 9/1994 | Brody et al. ............................. | 235/379 |
| 5,546,523 | 8/1996 | Gatto ...................................... | 235/379 X |
| 5,557,516 | 9/1996 | Hogan ..................................... | 364/406 |
| 5,650,604 | 7/1997 | Marcous et al. ......................... | 235/379 |
| 5,677,955 | 10/1997 | Doggett et al. ......................... | 235/379 X |
| 5,832,464 | 11/1998 | Houvener et al. ...................... | 235/379 X |

*Primary Examiner*—Michael G Lee
*Attorney, Agent, or Firm*—Tod R. Nissle, P.C.

[57] ABSTRACT

A currency transfer system provides for the transfer of currency between two countries in which different languages are spoken. The system includes a pre-printed envelope including imprinted indicia indicating a preselected currency amount, an envelope identification number, and a security code. The system also includes a remote terminal, a host computer, and a dispensing terminal. The remote terminal transmits the preselected currency amount, the security code and the envelope identification number to the host computer. The host computer authorizes the dispensing of the preselected currency amount by the dispensing terminal on receipt from the dispensing terminal of the security code.

6 Claims, 4 Drawing Sheets

SYSTEM AND METHOD FOR TRANSFER OF FUNDS USING PREPRINTED SEALED SECURITY CODE PACKET AND AUTOMATED TELLER MACHINE

BACKGROUND OF THE INVENTION

1. Field of the Invention

This invention relates to systems and procedures for transferring currency.

More particularly, the invention relates to a currency transfer system which does not require the generation of unique personal identification numbers during a transfer of currency, which eliminates the necessity of transmitting PIN numbers and other security codes between a host computer and the sender of currency, and which does not require the recipient of the funds to enter in an ATM the amount of currency being transferred to the recipient.

2. Description of the Prior Art

Currency transfer systems are well known in the art. For example, U.S. Pat. No. 5,350,906 to Brody et al. discloses a currency transfer system in which a sender inserts at an ATM a temporary ATM card to deposit money which can be transferred to an intended recipient. U.S. Pat. No. 5,326,906 discloses a system in which a sender deposits an amount of currency, after which the system creates a unique identification number associated with the currency that is deposited. The unique identification number can be utilized to later withdraw the deposited currency. U.S. Pat. No. 5,650,604 discloses a currency transfer system in which a sender designates at a terminal (i.e., at an ATM, a telephone, a personal computer, etc.) both a security code and the amount of currency to be transferred. On receipt of this information from the terminal, a host computer generates and transmits to the terminal a unique personal identification number. The sender provides the intended recipient (usually by telephone) the amount of currency being transferred, the security code, and the unique personal identification number. The intended recipient then goes to a dispensing ATM and enters the amount of currency being transferred, the security code, and the unique personal identification number. The host computer receives this information from the dispensing ATM and directs the dispensing ATM to dispense the currency to the intended recipient. While the foregoing prior art systems each have their advantages, their are several disadvantages associated with the systems, especially when a sender wishes to present cash for transfer. First, many prior art systems are tailored to a sender who has a bank account or credit card account. In many instances, individuals prefer simply offering cash to performing a transaction associated with a bank or credit card account. In view of the large debt owed various credit card companies, it is, in fact, a primary object of the invention to facilitate cash transfers to reduce the likelihood that a consumer will rely on or have to carry a credit card. Second, when a sender utilizes cash, a bank teller or store clerk often is involved, increasing the likelihood that the transfer will not be correctly documented or carried out. Third, systems which rely on and require the generation of a unique identification code during the transaction are not preferred, particularly when a store clerk is involved. Such a unique identification code may be incorrectly reported by the store clerk to the sender, may be associated with a transaction number entered by the store clerk, may be misappropriated by the store clerk, or may be misplaced by the sender. Fourth, currency transfer systems which require the transmission of security codes, currency amounts, and PIN numbers between computers are not preferred because the transmission of such data, along with the unique identification code generated during the transaction, requires additional transmission time. In addition, the transmission of such information over the Internet is presently not desirable. Fifth, having recipients punch into an ATM the amount of money being received is not preferred because the recipient may not wish for bystanders to be able to see him enter the amount of money he is receiving. Sixth, many cash transfer systems do not facilitate the transfer of currency between countries having different languages.

Accordingly, it would be highly desirable to provide an improved currency transfer system and process which would, while being less susceptible to fraud, not require (1) generation of a unique personal identification code when a sender presented cash for transfer, (2) the transmission of both the unique personal identification code and a PIN number between the sender and the host computer, (3) a sales clerk to generate and view a personal identification code, and (4) a recipient to input the amount of currency being transmitted in order to retrieve the currency from an ATM.

It would also be highly desirable to provide an improved currency transfer system and process which would facilitate the transfer of currency between countries having different languages.

Therefore, it is a principal object of the invention to provide an improved currency transfer system and process.

A further object of the invention is to provide an improved currency transfer system which does not require the generation of unique identification codes during use of the system by a person sending currency to a designated recipient.

Another object of the invention is to provide an improved currency transfer system which does not require the transmission both of security codes and PIN numbers between a host computer and a remote terminal being utilized by a sender of currency, especially when such transmission is over the Internet.

Still a further object of the invention is to provide an improved currency transfer system which, when cash is presented by a sender to a bank teller or store clerk, does not permit the teller or clerk to view a security code critical to retrieval of the currency by the intended recipient of the currency.

Still another object of the invention is to provide an improved currency transfer system which facilitates the transfer of currency by an individual who is temporarily in a country having a language different from the native language of the individual.

BRIEF DESCRIPTION OF THE DRAWINGS

These and other, further and more specific objects and advantages of the invention will be apparent to those skilled in the art from the following detailed description thereof, taken in conjunction with the drawings, in which.

SUMMARY OF THE INVENTION

Figure 1:
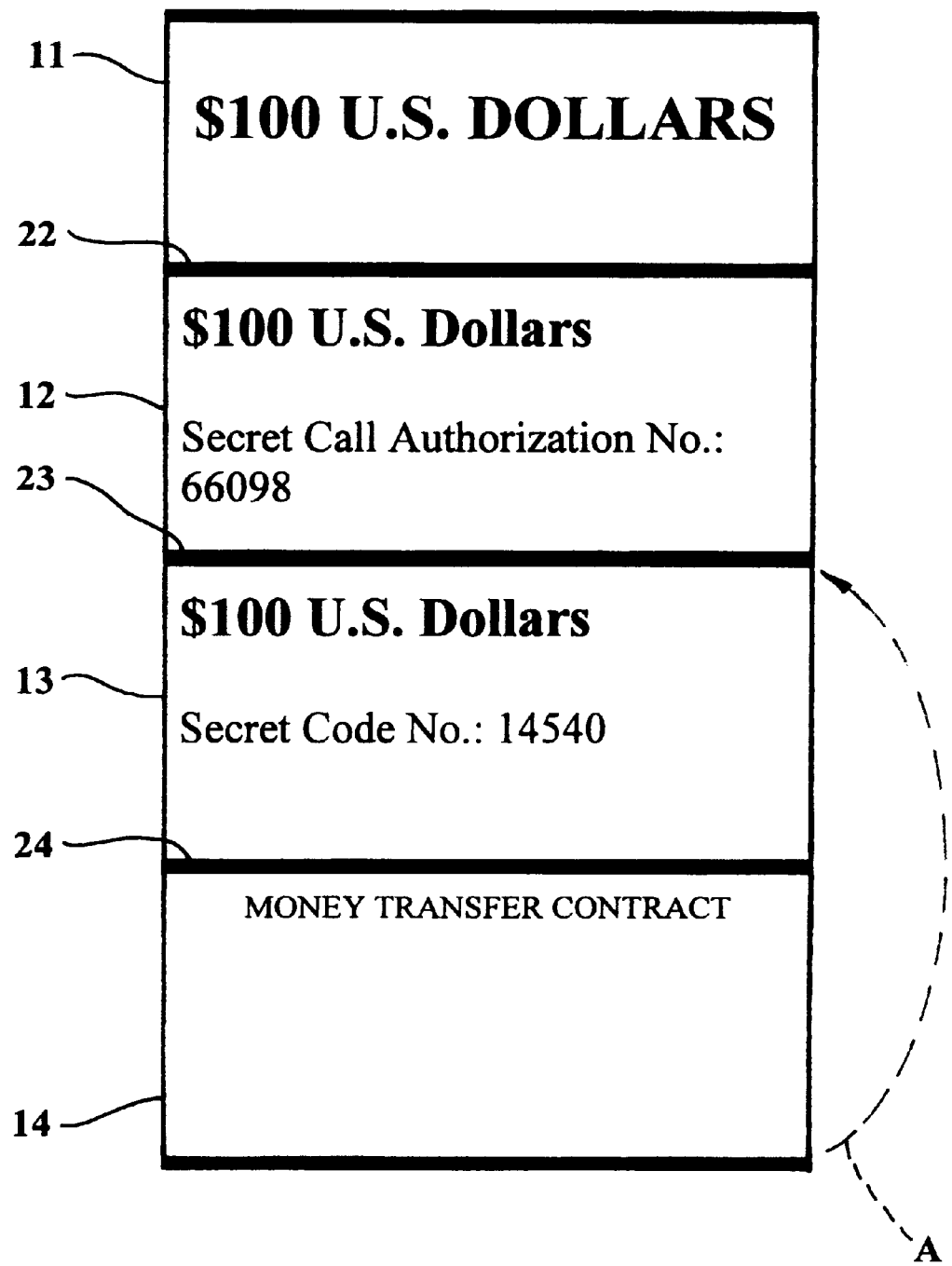
FIG. 1 is a back view of a pre-printed sheet of paper which is folded to form an envelope offered to customers by banks, retail store outlets, or other desired business establishments.

Briefly, in accordance with my invention, I provide an improved system for the transfer of funds between a sender and a recipient. The system includes at least one pre-printed envelope including a sealed portion having an outer visible surface and an inner surface which is hidden until said envelope is unsealed and opened. The sealed portion includes on the outer visible surface indicia (i.e., a letter, number or other character or mark) indicating a preselected currency amount and a reference number identifying the envelope, and includes on the inner surface at least one security code. The pre-printed envelope also includes a removable flap attached to the sealed portion and including indicia indicating the preselected currency amount and the reference number identifying the envelope. The currency transfer system further includes a remote terminal for receiving the preselected currency amount and the reference number and for generating signals including the preselected currency amount and the reference number, and includes a host computer. The host computer includes a memory including the reference number and a reference currency amount and reference security code associated with said reference number; a system for receiving the signals including the reference number, the preselected currency amount, and the security code and for comparing the preselected currency amount to the reference currency amount, and for comparing the reference security code to the security code; and, a system for, when the security code and reference security code match and the preselected currency amount and the reference currency amount match, approving the transfer of the preselected currency amount to a recipient entering the security code. The currency transfer system also includes a dispensing terminal for receiving the security code, transmitting the security code to the host computer, and, for dispensing the preselected amount defined and authorized by the host computer.

In another embodiment of my invention, I provide an improved method for transferring funds between a sender and a recipient. The method includes the step of providing at least one pre-printed envelope including a sealed portion having an outer visible surface and an inner surface which is hidden until the envelope is unsealed and opened. The sealed portion includes on the outer visible surface indicia indicating a preselected currency amount and a reference number identifying the envelope, and includes on the inner surface at least one security code. The envelope also includes a removable flap attached to the sealed portion and including indicia indicating the preselected currency amount and the reference number identifying the envelope. The method also includes the steps of placing the pre-printed envelope in a retail store; providing a terminal in the store for receiving the preselected currency amount and the reference number and for generating signals including the preselected currency amount and the reference number; and, providing a host computer. The host computer includes a memory including the reference number and a reference currency amount and reference security code associated with the reference number; a system for receiving the signals including the reference number, the preselected currency amount, and the security code, and for comparing the preselected currency amount to the reference currency amount, and for comparing the reference security code to the security code; and, a system for, when the security code and reference security code match and the preselected currency amount and the reference currency amount match, approving the transfer of the preselected currency amount to a recipient entering the security code. The method further includes the steps of providing a dispensing terminal for receiving the security code, transmitting the security code to the host computer, and, for dispensing the preselected amount defined and authorized by the host computer; and, on receipt at the retail store from a customer of the preselected amount of currency and the pre-printed envelope, entering the preselected currency amount and the reference number in the terminal in the retail outlet, removing the flap from the envelope, and returning the sealed portion to the customer.

In a further embodiment of the invention, I provide a pre-printed currency transfer envelope including a sealed portion having an outer visible surface and an inner surface which is hidden until the envelope is unsealed and opened. The sealed portion includes on the outer visible surface indicia indicating a preselected currency amount and a reference number identifying the envelope, and on the inner surface at least one security code. The preprinted envelope also includes a removable portion attached to the sealed portion, removable from the sealed portion without opening the sealed portion, and including indicia indicating the preselected currency amount and the reference number identifying the envelope. The pre-printed envelope can include instructions written in a foreign language.

In still a further embodiment of the invention, I provide a system for the transfer of funds between a sender in a first country having a first language and a recipient in a second country having a second language different from the first language. The system includes at least one pre-printed envelope in the first country including a sealed portion having an outer visible surface and an inner surface which is hidden until the envelope is unsealed and opened. The sealed portion includes on the outer visible surface indicia indicating a preselected currency amount and a reference number identifying the envelope; and, on the inner surface at least one security code. The pre-printed envelope also includes instructions written in the second language. The fund transfer system further includes a remote terminal in the first country for receiving the preselected currency amount and the reference number and for generating signals including the preselected currency amount and the reference number; and, includes a host computer. The host computer includes a memory including the reference number and a reference currency amount and reference security code associated with said reference number; including a system for receiving the signals including the reference number, the preselected currency amount, and the security code and for comparing the preselected currency amount to the reference currency amount, and for comparing the reference security code to the security code; and, including a system for, when the security code and the reference security code match and the preselected currency amount and the reference currency amount match, approving the transfer of the preselected currency amount to a recipient entering the security code. The fund transfer system also includes a dispensing terminal in the second country for receiving the security code; for transmitting the security code to the host computer; and, for dispensing the preselected amount defined and authorized by the host computer. The dispensing terminal includes instructions in the second language.

In yet still a further embodiment of the invention, I provide an improved system for the transfer of funds between a sender and a recipient. The improved system includes at least one pre-printed envelope. The pre-printed envelope includes a sealed portion having an outer visible surface and an inner surface which is hidden until the envelope is unsealed and opened. The sealed portion includes on the outer visible surface indicia indicating a preselected currency amount and a reference number identifying the envelope; and, on the inner surface at least one security code. The pre-printed envelope also includes a removable portion attached to the sealed portion and includes indicia indicating the preselected currency amount and a reference number identifying the envelope. The fund transfer system also includes a systems for accepting payment for and validating the envelope; and, a dispensing terminal for receiving the security code and dispensing the preselected amount of currency.

DESCRIPTION OF THE PREFERRED EMBODIMENTS

Turning now to the drawings, which depict the presently preferred embodiment of the invention for the purpose of illustrating the practice thereof and not by way of limitation of the scope of the invention, and in which like reference characters refer to corresponding elements throughout the several views, FIG. 1 illustrates the inner surface of a pre-printed rectangular sheet of paper or other material which is folded to form the pre-printed envelope of the invention. The sheet of FIG. 1 includes four rectangular portions 11 to 14 of equivalent size. The shape and dimension of the sheet can vary as desired, as can the number and shape of the portions of the sheet. Portions 11 and 12 are connected along a line indicated by pre-printed fold line 22 (as will be seen, each fold line imprinted on the inner surface has an opposed parallel adjacent fold line imprinted on the outer surface of the rectangular sheet of paper). Portions 12 and 13 are connected along a line indicated by pre-printed fold line 23. Portions 13 and 14 are connected along a line indicated by pre-printed fold line 24. The inside surface of portion 11 is imprinted with "$100 U.S. DOLLARS". The inside surface of portion 12 is imprinted with:

"$100 U.S. Dollars

Secret Call Authorization No.:

66098"

The inside surface of portion 13 is imprinted with:

"$100 U.S. Dollars

Secret Code No.: 14540

The secret code no. can comprise any number of letters, numbers, or other characters or marks. Presently, however, the secret code no. preferably includes six or more characters. The secret code can be unitary or have two or more parts. By way of example, and not limitation, the first part of the secret code can be a PIN no. and the second part of the secret code can comprise a random number.

The inside surface of portion 14 is imprinted with "MONEY TRANSFER ACCOUNT" and is also, although not shown, imprinted with the contract between the customer and the company providing the currency transfer service.

The sheet of paper illustrated in FIG. 1 is folded by (1) taking the lowermost horizontal edge in FIG. 1 and folding portion 14 along fold line 24 in the direction indicated by arrow A such that said lowermost horizontal edge is adjacent and contacting fold line 23 and such that the inside surface of portion 14 is adjacent, in registration with, and contacting the inside surface of portion 13, and (2) by taking the adjacent portions 13 and 14 and folding them simultaneously along fold line 23 such that fold line 24 is adjacent fold line 22 and such that the outer surface of portion 14 is adjacent and in registration with the inner portion of portion 12. After being folded in this manner, portions 12, 13, 14, of the envelope are sealed closed (with adhesive, with a sticker, etc.) such that the seal has to be broken in order to open portions 12, 13, 14 to the orientation illustrated in FIG. 1. After portions 12, 13, 14 are sealed closed, portion 11 remains attached along fold line 22 to portion 12 such that portion 11 functions as a flap which can be pivoted about fold line 25 to expose readily either side of portion 11.

Figure 2:
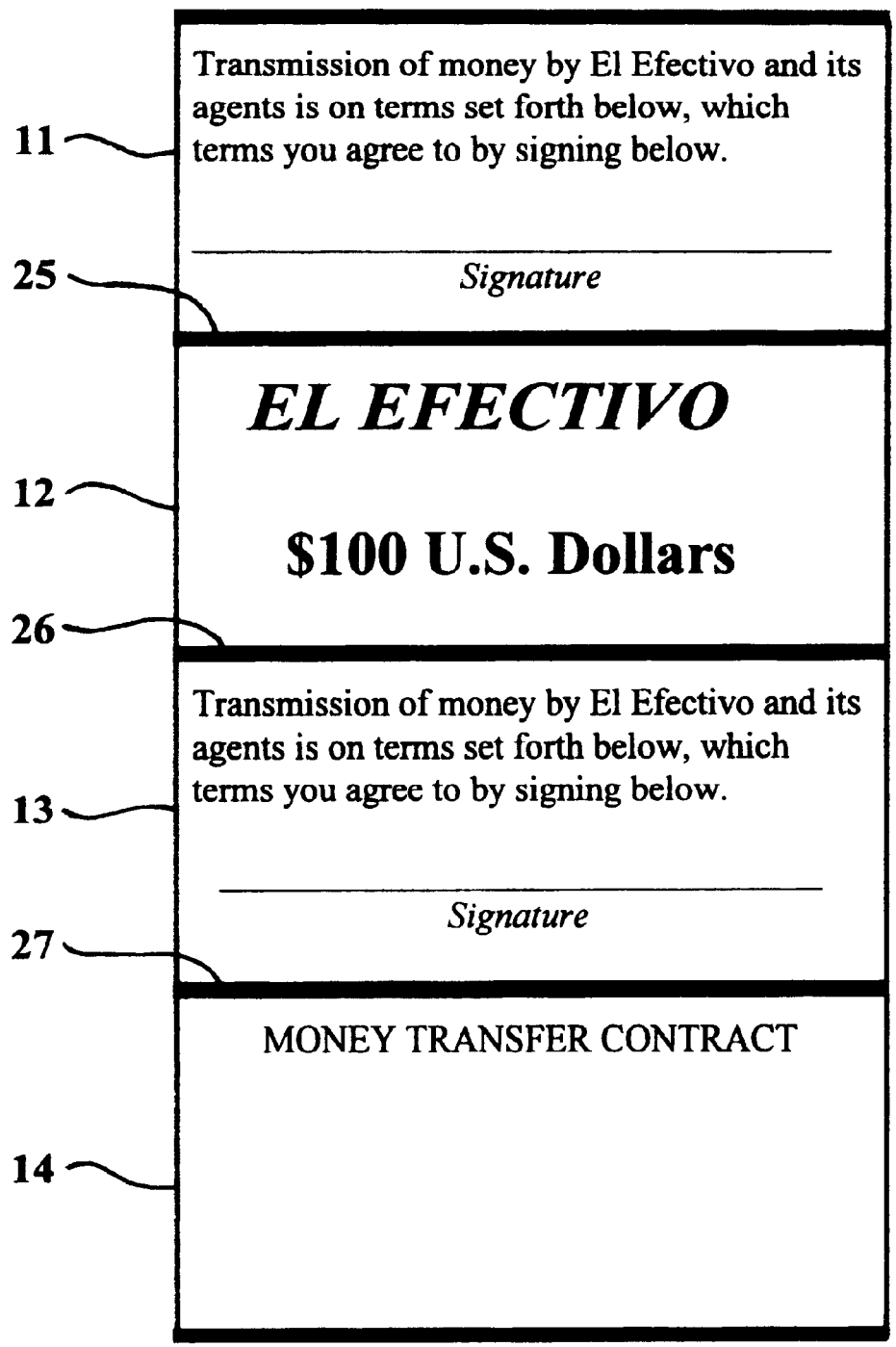
FIG. 2 is a front front view of the pre-printed sheet of paper of FIG. 1.

FIG. 2 illustrates the outer side of the sheet of paper of FIG. 1. The outer surface of portion 11 is imprinted with:

"Transmission of money by El Efectivo and its agents is on terms set forth below, which terms you agree to by signing below.

Signature"

The outer surface of portion 12 is imprinted with:

"EL EFECTIVO $100 U.S. Dollars"

"El Efectivo" is the trade name of the company providing the currency transfer service. The outer surface of rectangular portion 13 is imprinted with:

"Transmission of money by El Efectivo and its agents is on terms set forth below, which terms you agree to by signing below.

Signature"

The outer surface of rectangular portion 14 is imprinted with "MONEY TRANSFER CONTRACT". The remainder of the contract is typically in "fine print" and is omitted for the sake of clarity. Although such a contract can address any desired term, the contract typically limits the amount of money which can be transferred to a particular recipient in a single day, limits the number of transfer per day, describes the obligation of the sender of the funds to notify the recipient of the security code and other necessary transaction information, describes the importance of keeping the security code secret, describes the currency which will be used to pay the recipient, describes the refund process, describes the liability of the vendor (i.e., of El Effectivo), etc. When the sheet of FIG. 2 is folded into an envelope in the manner earlier described, the outer surface of portion 14 is adjacent and contacting the inner surface of rectangular portion 12.

Fold lines 25, 26, 27 are imprinted on the outer side and are parallel and opposed to lines 22, 23, 24, respectively, printed on the inner side of the sheet of paper.

The outer surface of portion 11 also includes a bar code (not shown) or other indicia identifying the selected currency amount (presently in $50 increments from $100 up to $750; or, up to the legal limit in each particular country) imprinted on the envelope formed by folding the sheet illustrated in FIGS. 1 and 2. This currency bar code can also appear on other portions 12 to 14. In FIGS. 1 and 2 the selected currency amount is $100. Similarly, the outer surface of portion 13 also includes a bar code (not shown) identifying the envelope reference number which is unique to the envelope formed by folding the sheet illustrated in FIGS. 1 and 2. This envelope bar code can also appear on other portions 11, 12, 14.

Figure 4:
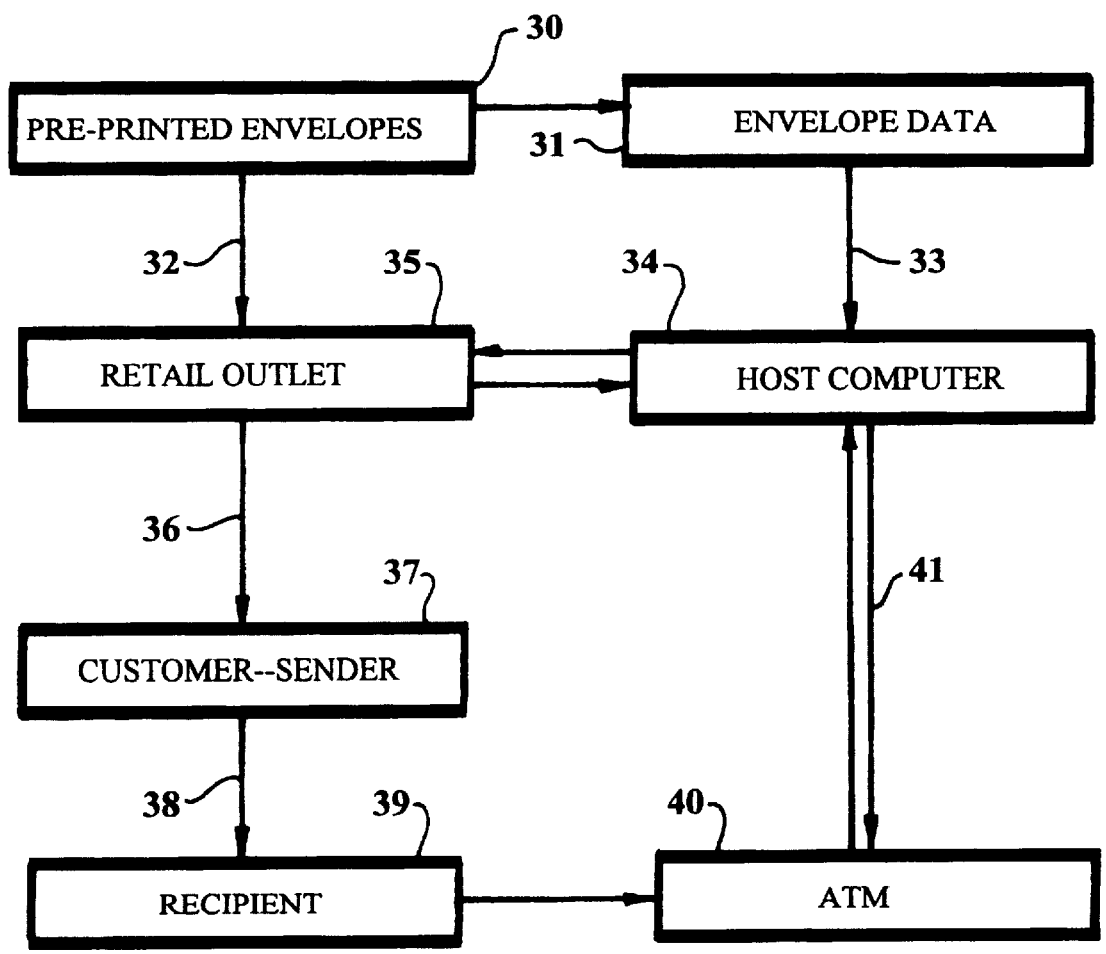

As shown in FIG. 4, after pre-printed envelopes 30 are prepared, the data 31 for each envelope is transmitted 33 into the memory of a host computer 34. The envelope data 31 includes the unique envelope reference number for each envelope, along with the secret call authorization no., the secret pin no., the selected currency amount, and the secret code no. associated with the reference number. The secret call authorization no., the secret pin no., and the secret code no. preferably are different for each unique envelope reference number. After the envelope reference number and associated secret number(s) associated with the envelope reference number for each sealed envelop are transmitted 33 into memory in the host computer 34, the sealed envelopes are distributed 32 to desired locations. While the sealed envelopes can be displayed at any desired location, it is presently preferred that a retail outlet 35 like a "SEVEN ELEVEN" or "CIRCLE K" convenience store be utilized. The sealed envelopes are stored in a display. The retail outlet 35 includes a terminal in communication with the host computer 34.

The selected currency amount on an envelope can vary as desired. For example, in FIGS. 1 and 2, the $100 amount can be replaced at each occurrence by $50 (or, $25, 75$, $200, etc.) when the envelope is printed. Groups of envelopes with differing selected currency amounts thereon are presently preferably, but not necessarily, printed. Some envelopes are imprinted for $25, others for $50, others for $100, etc. The envelope shown in FIGS. 1 and 2 is imprinted with a selected currency amount of $100. A variety of envelopes showing different currency amounts are preferably displayed at a retail outlet: some envelopes display a selected currency amount of $25, some envelopes display a selected currency amount of $50, some display $100.00, etc. This enables a customer entering a retail outlet to select differing amounts of currency that he or she may wish to transfer.

A customer—sender 37 enters the store, selects an envelope, say an envelope imprinted with a currency amount of $50.00, and completes the envelope by signing on the signature lines shown in FIG. 2 and, if necessary, by writing in any other requested information in a space provided on the envelope. Other requested information can include the customer's address, telephone number, or any other desired information. After the envelope is completed, the customer hands the envelope to the store clerk along with $50.00 and any other amount required to process and transfer the finds to a recipient selected by the customer. The store clerk passes the bar code on the outer surface of portion 11 under a bar code reader to input into the processing terminal the currency amount ($50) exhibited on the envelope. The clerk then passes the bar code on the outer surface of portion 13 under the bar code reader to input the envelope reference number. The processing terminal transmits (via a telephone, via the Internet or other computer network, via microwave, via satellite, or via any other desired communication system or apparatus) the currency amount and the envelope reference number to the host computer 34. The host computer confirms the reference number and currency amount and transmits (via any desired communication system or apparatus) a validation signal to the terminal. The store clerk tears off and retains the envelope "tab" (i.e., tears off and retains portion 11) and returns 36 the sealed portion of the envelope to the customer. The customer opens the sealed portion of the envelope in private and then transmits 38 (typically by telephone) at least the secret code number 14540 to the intended recipient of the $50 currency transfer. A secret pin no. (for example, the four digit pin number used by many bank customers) and secret call authorization no. 66098 can also, if desired, be transmitted to the intended recipient. The recipient travels to an ATM 40 (or to any other desired point of sale (POS) device or currency dispensing terminal) and enters the secret code no. 14540. ATM 40 transmits (via any desired communication system or apparatus) the secret code no. 14540 to the host computer 34. The host computer checks its records to insure that the code no. 14540 is valid and that the envelope bearing the code no. 14540 has been purchased. After ascertaining that the code no. 14540 is valid and that the envelope with that code no. has been purchased, host computer 34 transmits (via any desired communication system or apparatus) 41 a validation command to ATM 40 such that ATM 40 dispenses $50.00 to the intended recipient. If desired, the intended recipient can also be required to input into ATM 40 the secret pin no., the secret call authorization no. 66098, or any other desired information which must be transmitted to host computer 34 to cause computer 34 to issue a validation command so that ATM 40 will dispense currency to the intended recipient.

If desired, customer—sender 37 can carry out multiple transactions in the manner described above for a single transaction, provided that customer—sender 37 has and inputs, via the store clerk or other means, to the host computer 34 a master code which is confirmed and validated by the host computer 34.

In the event customer—sender 37 presents a pay check to the store clerk, the processing terminal is programmed to deduct appropriate state and federal taxes from the pay check and to transmit data defining such deductions to host computer 34 or to another desired computer. The customer—sender 37 can transfer to the intended recipient the portion of his pay check remaining after such deductions.

Figure 3:
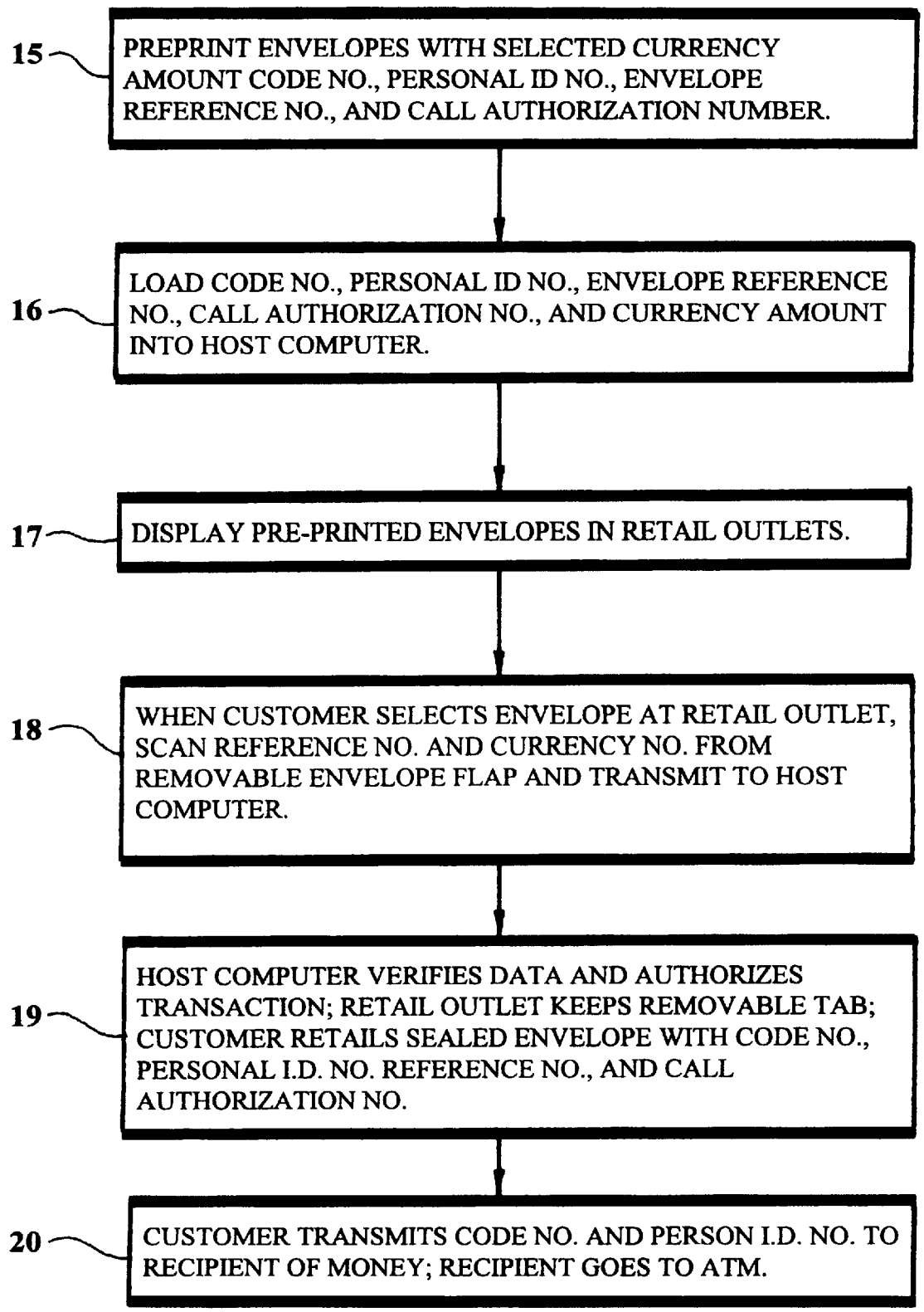
FIG. 3 is a block flow diagram illustrating a currency transfer system carried out in accordance with the principles of the invention; and, FIG. 4 is a block diagram further illustrating the currency transfer system of the invention.

In one preferred embodiment of the invention, the currency transfer system of the invention is adapted for use by foreign nationals desiring to transfer currency back to relatives or other individuals in their country of origin. This preferred embodiment is explained with reference to FIG. 3.

The first step 15 in this embodiment of the invention is to preprint envelopes with a selected currency secret code no., personal id no. (PIN no.), envelope reference no., selected currency amount, and secret call authorization no. In the manner illustrated in FIGS. 1 and 2. In contrast, however, to the sheet shown in FIGS. 1 and 2, all instructions are printed in Spanish, and not English. It is, however, understood that the instructions can be printed in any desired language or languages.

The second step 16 in this embodiment is to load the secret code no., personal id no., envelope reference no., call authorization no., and currency amount into the host computer.

The third step 17 is to display the pre-printed envelopes in a retail outlet in a country having a primary native language other than Spanish. For sake of example, it is assumed the country is the United States of America, where the primary native language is English. If desired, however, the envelopes can be utilized in a country which has Spanish as its primary language.

The third step 18 is to have a Spanish speaking customer select an envelope at a retail outlet in the United States, to have the Spanish speaking customer fill out and sign the envelope as necessary, to have the Spanish speaking customer give the English speaking retail clerk the envelope and the money necessary to pay for the selected currency amount on the envelope along with any transaction or processing fees, and to have the retail clerk scan into the terminal at the retail outlet the reference no. and currency no. from the envelope. The terminal transmits, via any desired communication system or apparatus, the information to the host computer 34.

In step 19, after the host computer 34 receives and verifies this information from the terminal, the host computer sends back, via any desired communication system or apparatus, a validation signal to the terminal in the retail outlet. The validation signal authorizes the transaction. The retail clerk removes portion 11 from the envelope and returns the sealed portion of the envelope to the customer.

In step 20, the customer transmits the secret code no. and person ID no. to the intended recipient of the money in Mexico, Spain, or another Spanish speaking country. The intended recipient goes to an ATM (or any other POS device or currency dispensing terminal) in Mexico, enters the secret code no. and, after the host computer 34 authorizes the transaction, commands the ATM to dispense currency to the intended recipient. The amount of currency dispensed equals the selected currency amount which was imprinted on the envelope originally selected by the customer—sender. The currency dispensed can consist of United States dollars, French francs, German marks, Mexican pesos or any other desired country currency. The ATM in Mexico includes instructions written in the Spanish language. It is, however, understood that the ATM in Mexico can include instructions written in any desired language or languages.

Having described my invention in such terms as to enable those skilled in the art to understand and practice it and having described the presently preferred embodiments thereof, I claim:

1. A system for the transfer of funds between a sender and a recipient including
   (a) at least one pre-printed envelope including
      (i) a sealed portion having an outer visible surface and an inner surface which is hidden until said envelope is unsealed and opened, said sealed portion including
         (A) on said outer visible surface indicia indicating a preselected currency amount and a reference number identifying said envelope,
         (B) on said inner surface at least one security code,
      (ii) a removable flap attached to said sealed portion and including indicia indicating said preselected currency amount and said reference number identifying said envelope;
   (b) a remote terminal for receiving said preselected currency amount and, said security code said reference number and for generating signals including said preselected currency amount, said security code and said reference number;
   (c) a host computer including
      (i) a memory including said reference number and a reference currency amount and reference security code associated with said reference number,
      (ii) means for receiving said signals including said reference number, said preselected currency amount, and said security code and for
         comparing said preselected currency amount to said reference currency amount, and
         comparing said reference security code to said security code, and said
      (iii) means for, when said security code and reference security code match and said preselected currency amount and said reference currency amount match, approving the transfer of said preselected currency amount to a recipient entering said security code; and,
   (d) a dispensing terminal for receiving said security code, transmitting said security code to said host computer, and, for dispensing said preselected amount defined and authorized by said host computer.

2. A method for transfering funds between a sender and a recipient including
   (a) providing at least one pre-printed envelope including
      (i) a sealed portion having an outer visible surface and an inner surface which is hidden until said envelope is unsealed and opened, said sealed portion including
         (A) on said outer visible surface indicia indicating a preselected currency amount and a reference number identifying said envelope,
         (B) on said inner surface at least one security code,
      (ii) a removable flap attached to said sealed portion and including indicia indicating said preselected currency amount and said reference number identifying said envelope;
   (b) placing said pre-printed envelope in a retail store;
   (c) providing a terminal in said store for receiving said preselected currency amount, said security code and said reference number and for generating signals including said preselected currency amount, said security code and said reference number;
   (d) providing a host computer including
      (i) a memory including said reference number and a reference currency amount and reference security code associated with said reference number,
      (ii) means for receiving said signals including said reference number, said preselected currency amount, and said security code and for
         comparing said preselected currency amount to said reference currency amount, and
         comparing said reference security code to said security code, and
      (iii) means for, when said security code and reference security code match and said preselected currency amount and said reference currency amount match, approving the transfer of said preselected currency amount to a recipient entering said security code;
   (e) providing a dispensing terminal for receiving said security code, transmitting said security code to said host computer, and, for dispensing said preselected amount defined and authorized by said host computer; and,
   (f) on receipt at said retail store from a customer of said preselected amount of currency and said pre-printed envelope, entering said preselected currency amount, said security code and said reference number in said terminal in said retail outlet, removing said flap from said envelope, and returning said sealed portion to said customer.

3. A pre-printed currency transfer envelope including
   (a) a sealed portion having an outer visible surface and an inner surface which is hidden until said envelope is unsealed and opened, said sealed portion including
      (i) on said outer visible surface indicia indicating a preselected currency amount and a reference number identifying said envelope,
      (ii) on said inner surface at least one security code,
   (b) a removable portion attached to said sealed portion, removable from said sealed portion without opening said sealed portion, and including indicia indicating said preselected currency amount and said reference number identifying said envelope.

4. The pre-printed envelope of claim 3 including instructions written in a foreign language.

5. A system for the transfer of finds between a sender in a first country having a first language and a recipient in a second country having a second language different from said first language including
   (a) at least one pre-printed envelope in said first country including (i) a sealed portion having an outer visible surface and an inner surface which is hidden until said envelope is unsealed and opened, said sealed portion including
   (A) on said outer visible surface indicia indicating a preselected currency amount and a reference number identifying said envelope,
   (B) on said inner surface at least one security code,
(ii) a removable portion attached to said sealed portion and including indicia indicating said preselected currency amount and said reference number identifying said envelope,
(iii) instructions written in said second language;
(b) a remote terminal in said first country for receiving said preselected currency amount, said security code and said reference number and for generating signals including said preselected currency amount, said security code and said reference number;
(c) a host computer including
   (i) a memory including said reference number and a reference currency amount and reference security code associated with said reference number,
   (ii) means for receiving said signals including said reference number, said preselected currency amount, and said security code and for
      comparing said preselected currency amount to said reference currency amount, and
      comparing said reference security code to said security code, and
   (iii) means for, when said security code and reference security code match and said preselected currency amount and said reference currency amount match, approving the transfer of said preselected currency amount to a recipient entering said security code; and,
(d) a dispensing terminal in said second country for receiving said security code, transmitting said security code to said host computer, and, for dispensing said preselected amount defined and authorized by said host computer, said dispensing terminal including instructions in said second language.

6. A system for the transfer of funds between a sender and a recipient including
(a) at least one pre-printed envelope including
   (i) a sealed portion having an outer visible surface and an inner surface which is hidden until said envelope is unsealed and opened, said sealed portion including
      (A) on said outer visible surface indicia indicating a preselected currency amount and a reference number identifying said envelope,
      (B) on said inner surface at least one security code,
   (ii) a removable portion attached to said sealed portion and including indicia indicating said preselected currency amount and said reference number identifying said envelope;
(b) means for accepting payment for and validating said envelope; and,
(c) a dispensing terminal for receiving said security code and dispensing said preselected amount of currency.

* * * * *